(12) United States Patent  (10) Patent No.: US 8,259,343 B2
Ikeda  (45) Date of Patent: Sep. 4, 2012

(54) IMAGE PROCESSING DEVICE AND IMAGE PROCESSING METHOD

(75) Inventor: Sanae Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 12/390,078

(22) Filed: Feb. 20, 2009

(65) Prior Publication Data

US 2009/0225372 A1 Sep. 10, 2009

(30) Foreign Application Priority Data

Mar. 6, 2008 (JP) .................................. 2008-056644

(51) Int. Cl.
G06K 15/02 (2006.01)

(52) U.S. Cl. ........ 358/1.2; 345/698; 358/3.09; 358/313; 382/289

(58) Field of Classification Search ........................ None
See application file for complete search history.

(56) References Cited

U.S. PATENT DOCUMENTS

| 5,602,572 | A | * | 2/1997 | Rylander ...................... 358/3.09 |
| 5,912,683 | A | * | 6/1999 | Eade ................................. 347/40 |
| 6,056,386 | A | * | 5/2000 | Nohata et al. ................... 347/19 |
| 6,264,299 | B1 | * | 7/2001 | Noda ................................ 347/15 |
| 2006/0203260 | A1 | * | 9/2006 | Aonuma ......................... 358/1.2 |
| 2007/0009024 | A1 | * | 1/2007 | Laaksonheimo ........ 375/240.01 |

FOREIGN PATENT DOCUMENTS

| JP | S63-102553 A | 5/1988 |
| JP | H01-136465 A | 5/1989 |
| JP | 04-070057 A | 3/1992 |
| JP | 05-344320 A | 12/1993 |

OTHER PUBLICATIONS

Japanese Office Action for Application No. 2008-056644 dated Nov. 18, 2011.

* cited by examiner

*Primary Examiner* — King Poon
*Assistant Examiner* — David S Cammack
(74) *Attorney, Agent, or Firm* — Carter, DeLuca, Farrell & Schmidt LLP

(57) ABSTRACT

The present invention provides an image processing device which is capable of avoiding disappearance of print data such as thin lines by increasing probability in which an original image is stored even after resolution conversion processing is executed to a binary image. In order to achieve this, the present invention may leave the pixels in any of the two lines halftone-processed with same threshold value row after the resolution conversion in a given ratio.

3 Claims, 6 Drawing Sheets

IMAGE PROCESSING DEVICE AND IMAGE PROCESSING METHOD

BACKGROUND OF THE INVENTION

1. Field of the Invention

The present invention relates to an image processing device and an image processing method which perform resolution conversion to a halftone image.

2. Description of the Related Art

There is known an image processing device which receives multi-value image data from an information processing device such as a host computer, executes halftone processing to the data and thereafter, transmits the data to an output device such as a printer for printing. When the resolution of the multi-value image is different from that of the output device, it is required to perform resolution conversion in the process of the image processing, but when the resolution of the multi-value image is equal to that of the output device, it is not required to perform the resolution conversion. Therefore, for example, in a case of outputting data produced using an application program on a host computer by a printer or the like, it is preferable for a printer driver in the host computer to generate the data fitted to the resolution of the printer.

However, in the following case, the resolution conversion is performed in an image processing device.

In a case of printing data with an output device of high resolution, when the image processing device requests an information processing device for the data fitted to the resolution of the output device, since an amount of the data which the image processing device receives from the information processing device is large, a processing speed of the image processing device is reduced. In this case, the image processing device generally requests the information processing device for data fitted to resolution lower than the resolution of the output device and processes the received data for expansion to be fitted to the resolution of the output device. In addition, in reverse, there is a case where the image processing device requests the information processing device for data fitted to resolution higher than the resolution of the output device and processes the received data for contraction to be fitted to the resolution of the output device.

Hereinafter, the latter case will be explained as an example.

In a typical output device, in most cases, the resolution in a main scanning direction is equal to that in a sub-scanning direction. However, in a case of a printing device using an electronic photograph system, when a rotational speed of a data printing portion (transfer drum or the like) is increased for increasing the printing speed of the printing device, the resolution in the sub-scanning direction is degraded. For example, upon increasing the rotational speed of the data printing portion by 1.5 times in the output device having the resolution of 600 dpi in each of the main scanning direction and the sub-scanning direction, the resolution in the sub-scanning direction becomes 400 dpi which is two-thirds of 600 dpi. In this case, it is assumed that the image processing device requests the information processing device for data fitted to the resolution of main scanning resolution of 600 dpi×sub-scanning resolution of 400 dpi so as to be fitted to the resolution of the output device. However, since an application program in the information processing device is possibly not adapted for the resolution which differs between a longitudinal direction and a lateral direction, the image processing device can not necessarily obtain the correct data. Therefore, the image processing device requests the information processing device for data having the resolution of 600×600 dpi in each of the longitudinal direction and the lateral direction and converts the resolution of the received data into the resolution of the output device. That is, the image processing device converts the resolution of main scanning resolution of 600 dpi×sub-scanning resolution of 600 dpi into the resolution of main scanning resolution of 600 dpi×sub-scanning resolution of 400 dpi.

In the aforementioned resolution conversion, there are two methods of a method performing resolution conversion to a multi-value image and a method of performing resolution conversion to a binary image (image obtained by performing halftone processing to a multi-value image) (for example, refer to Japanese Patent Laid-Open No. H01-136465(1989) or Japanese Patent Laid-Open No. S63-102553(1988)). Further, the method of performing the resolution conversion to the binary image includes a method of simply performing expansion and contraction to the binary image according to a given rule. Further, there is a method where a binary image is converted into a multi-value image in accordance with resolution of the output device, halftone processing is executed to the multi-value image to again generate a binary image, and resolution conversion is performed to the binary image.

Since the halftone processing is executed to the multi-value image after the resolution conversion in the method of performing the resolution conversion to the multi-value image, a tone quality of the binary image is not affected by the resolution conversion. However, this method has a problem that a storage region for resolution conversion processing is increased in size because of performing the resolution conversion to the multi-value image. On the other hand, in a case of the method of performing the resolution conversion to the binary image, the storage region for resolution conversion processing maybe made small in size. However, upon performing resolution conversion such as simple expansion processing or simple contraction processing to the binary image, there occurs the problem that moiré is generated in a halftone concentration region of the multi-value or an intermediate concentration of the multi-value is made to be changed without being held. In addition, in a case of a method where the binary image is converted into the multi-value image in accordance with the resolution of the output device, the halftone processing is executed to the multi-value image to again generate the binary image, there occurs the problem that the processing is complicated and the processing time is increased because of performing the halftone processing twice.

SUMMARY OF THE INVENTION

Exemplary embodiments of the present invention have the following construction for solving the foregoing problem.

According to an exemplary embodiment of the present invention, an image processing device that outputs a binary image to an output device in which resolution in a main scanning direction is higher than that of a sub-scanning direction includes a thinning device which thins a plurality of pixels from a binary image in which the resolution in the main scanning direction is equal to that in the sub-scanning direction to generate a binary image in which the resolution in the main scanning direction is higher than that of the sub-scanning direction. The thinning device, instead of thinning all pixels contained in a line extending in the sub-scanning direction of the binary image in which the resolution in the main scanning direction is equal to that in the sub-scanning direction, thins pixels contained in a line adjacent to the line.

According to an exemplary embodiment of the present invention, an image processing device that outputs a binary image to an output device in which resolution in a sub-scanning direction is higher than that in a main scanning direction and includes a thinning device which thins a plurality of pixels from a binary image in which the resolution in the sub-scanning direction is equal to that in the main scanning direction to generate a binary image in which the resolution in the sub-scanning direction is higher than that in the main scanning direction. The thinning device, instead of thinning all pixels contained in a line extending in the main scanning direction of the binary image in which the resolution in the sub-scanning direction is equal to that in the main scanning direction, thins pixels contained in a line adjacent to the line.

According to an exemplary embodiment of the present invention, an image processing device that outputs a binary image to an output device in which resolution in a main scanning direction is higher than that in a sub-scanning direction includes a halftone processing device that compares a multi-value image with a dither matrix to generate a binary image in which the resolution in the main scanning direction is equal to that in the sub-scanning direction and a thinning device which thins a plurality of pixels from the binary image in which the resolution in the main scanning direction is equal to that of the sub-scanning direction to generate a binary image in which the resolution (H (dpi)) in the main scanning direction is higher than that (L (dpi)) in the sub-scanning direction. The halftone processing device generates a dither matrix including S pieces of lines in the sub-scanning direction (where $S=(P-Q)+1$, and where, $P=H/B$, $Q=L/B$ and B is a greatest common factor between H and L). Further, in the dither matrix, a first line to a S-th line among the S pieces of the lines are adjacent to each other in the sub-scanning direction and hold same threshold rows. The thinning device outputs, as pixels adjacent in the main scanning direction in the binary image in which the resolution in the main scanning direction is higher than that in the sub-scanning direction, pixels in a binary image obtained using an F-th dither value in the main scanning direction among dither threshold rows contained in an F-th line (where $1<=F<=S-1$) among the S pieces of the lines and pixels in a binary image obtained using a (F+1)-th dither value in the main scanning direction among dither threshold rows contained in a (F+1)-th line among the S pieces of the lines.

According to an exemplary embodiment of the present invention, an image processing device that outputs a binary image to an output device in which resolution in a sub-scanning direction is higher than that in a main scanning direction includes a halftone processing device that compares a multi-value image with a dither matrix to generate a binary image in which the resolution in the sub-scanning direction is equal to that in the main scanning direction and a thinning device which thins a plurality of pixels from the binary image in which the resolution in the sub-scanning direction is equal to that in the main scanning direction to generate a binary image in which the resolution (H (dpi)) in the sub-scanning direction is higher than that (L (dpi)) in the main scanning direction. The halftone processing device generates a dither matrix including S pieces of lines in the main scanning direction (where $S=(P-Q)+1$, and where $P=H/B$, $Q=L/B$ and B is a greatest common factor between H and L). Further, in the dither matrix, a first line to a S-th line among the S pieces of the lines are adjacent to each other in the main scanning direction and hold same threshold rows. The thinning device outputs, as pixels adjacent in the sub-scanning direction in the binary image in which the resolution in the sub-scanning direction is higher than that in the main scanning direction, pixels in a binary image obtained using an F-th dither value in the sub-scanning direction among dither threshold rows contained in an F-th line (where $1<=F<=S-1$) among the S pieces of the lines and pixels in a binary image obtained using a (F+1)-th dither value in the sub-scanning direction among dither threshold rows contained in a (F+1)-th line among the S pieces of the lines.

According to an exemplary embodiment of the present invention, an image processing method that outputs a binary image to an output device in which resolution in a main scanning direction is higher than that of a sub-scanning direction includes a thinning step which thins a plurality of pixels from a binary image in which the resolution in the main scanning direction is equal to that in the sub-scanning direction to generate a binary image in which the resolution in the main scanning direction is higher than that in the sub-scanning direction. The thinning step, instead of thinning all pixels contained in a line extending in the sub-scanning direction of the binary image in which the resolution in the main scanning direction is equal to that in the sub-scanning direction, thins pixels contained in a line adjacent to the line.

The above-described method can be carried out by a computer.

The present invention produces a dither pattern where the same threshold value is located at pixel positions where thinning processing is scheduled to be executed after the halftone processing. The binary image generated using the dither pattern is equivalent to an image obtained by expanding a contraction image obtained by performing resolution conversion (contraction processing) to the binary image, to the original resolution. The resolution conversion, for example, in a case of converting a binary image in which the resolution in a main scanning direction is 600 dpi into the binary image in which the resolution in a main scanning direction is 400 dpi, is realized by thinning pixels corresponding to one line out of three lines in the main scanning direction of the binary image. In this case, since the two lines adjacent as thinned objects are processed with the same threshold value, if the concentration value of the original image is the same, the two lines have the same images. Therefore, even if the resolution conversion is performed by thinning any of the two lines for contraction processing, information of the original image is held.

Further, in a case where the original image can be realized only with resolution higher than the resolution after the conversion, for example, in a case where the original image is a thin line of a one-dot width having the resolution of 600 dpi, when either one of the lines is thinned simply, there occurs the event in which the pixel remains or does not remain depending on the thinning position. When the event occurs that the pixel does not remain, the thin line of the one-dot width having the resolution of 600 dpi in the original image completely disappears. Therefore, the present invention does not fix a thinning line upon thinning pixels for the resolution conversion, and alternately leaves pixels in a plurality of lines processed with the same threshold value. That is, the pixels in the two adjacent lines are thinned in a staggered form. In consequence, in the present invention, it is possible to leave the pixels in any of the two lines halftone-processed with same threshold value after the resolution conversion in a given ratio. That is, according to the present invention, the probability for storing the original image is increased even after processing the resolution conversion, and it is possible to avoid the disappearance of the print data such as thin lines.

Further features of the present invention will become apparent from the following description of exemplary embodiments (with reference to the attached drawings).

DESCRIPTION OF THE EMBODIMENTS

Embodiments of the present invention will be explained with reference to the drawings.

Figure 1:
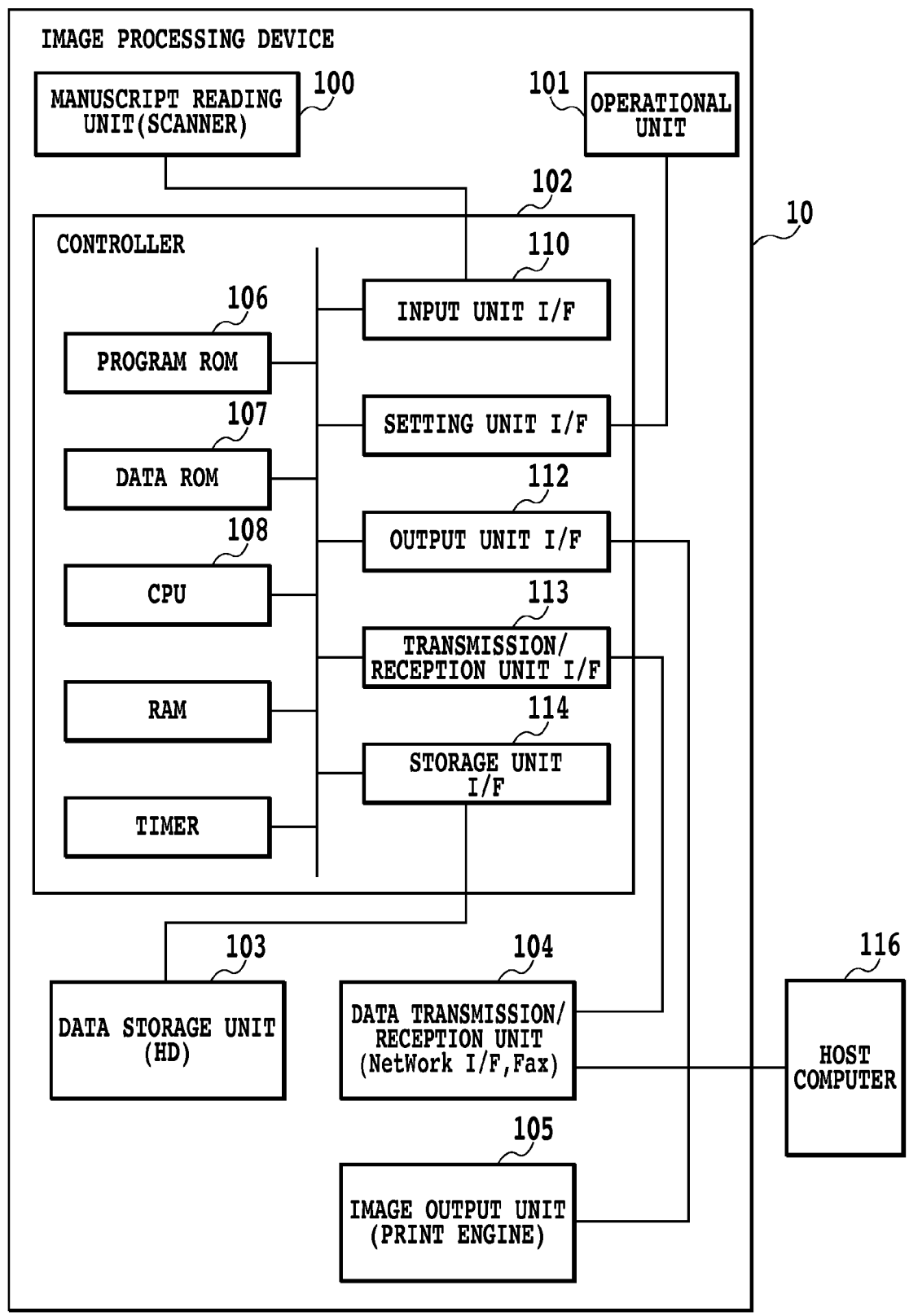
FIG. 1 is a block diagram showing an exemplary construction of an image processing device according to an exemplary embodiment of the present invention.

FIG. 1 is a block diagram showing an exemplary construction of an image processing device according to an exemplary embodiment the present invention.

An image processing device 10 is provided with a manuscript reading unit (e.g., scanner) 100, an operational unit 101, a controller 102, a data storage unit 103, a data transmission/reception unit 104, and an image output unit 105. The controller 102 includes therein the respective units described below and controls the image processing device.

The manuscript reading unit 100 sends the read image data to an input unit interface (I/F) 110 in the controller 102. A processing unit (CPU) 108 in the controller 102 processes the image data received from the manuscript reading unit 100, according to a program stored in program ROM 106 and data stored in data ROM 107. The CPU 108 stores the image data in the middle of the processing or the image data the processing of which is completed, in the data storage unit 103 as needed via a storage unit interface (I/F) 114. In addition, the CPU 108 sends the image data the processing of which is completed to the data transmission/reception 104 via a transmission reception unit interface (I/F) 113 or to the image output unit 105 via an output unit interface (I/F) 112.

The data transmission/reception unit 104 sends image data to an external device such as a host computer 116 through a communication network. The image output unit 105 performs print output on a print sheet based upon the image data.

When the data transmission/reception unit 104 receives the data from the host computer 116 or the like, the image output unit 105 prints and outputs the received data.

A first exemplary embodiment is described in detail below with reference to FIGS. 2 to 5.

Figure 2:
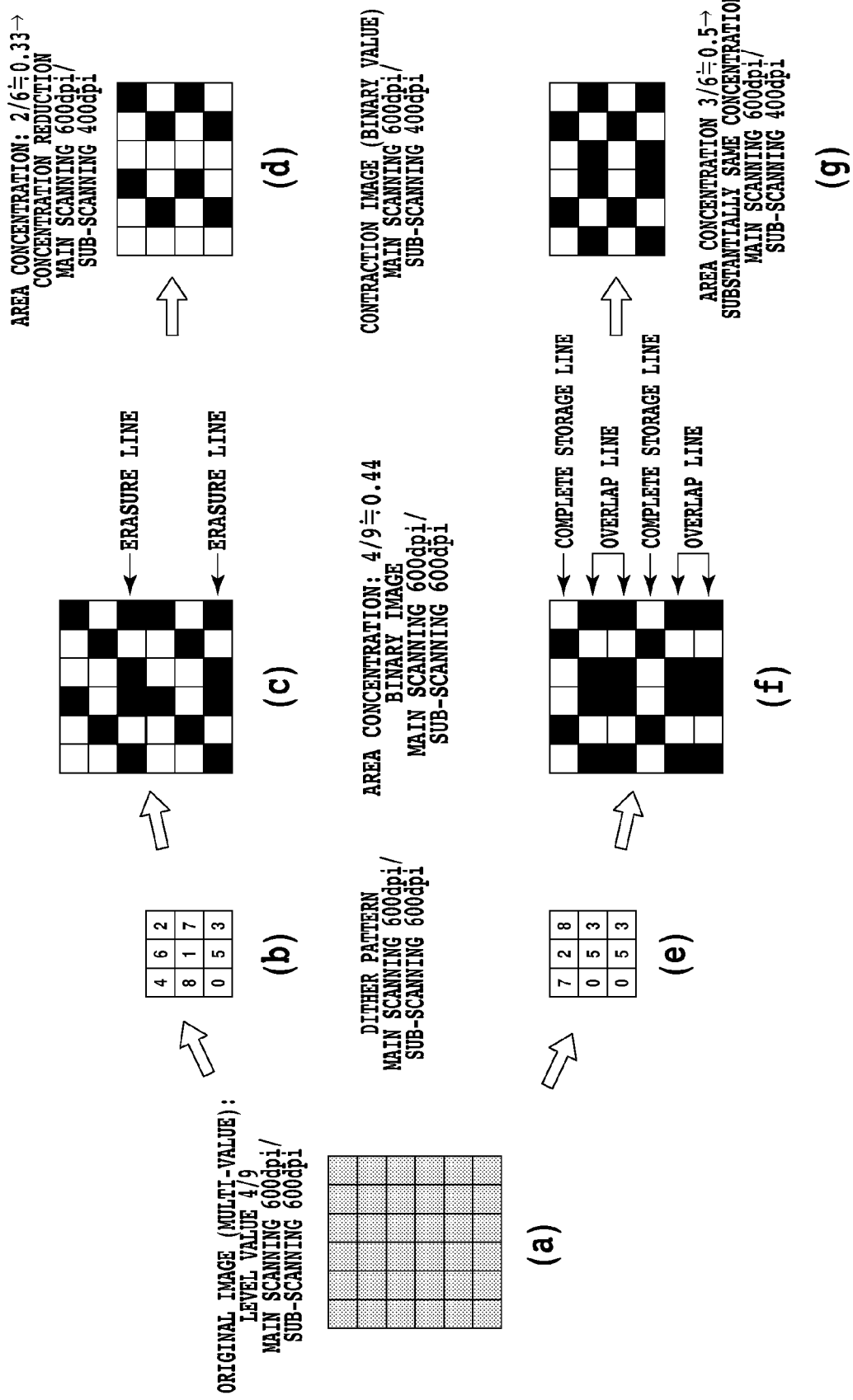
FIG. 2 illustrates an overview of halftone processing to a multi-value image and resolution conversion processing to a binary image and particularly, a concentration change after the resolution conversion.

FIG. 2 illustrates an overview of halftone processing to a multi-value image and resolution conversion processing to a binary image, and in particular illustrates a concentration change after resolution conversion.

In FIG. 2, (a) shows an input image (multi-value) as an original image. Resolution of the input image (a) is set as main scanning resolution of 600 dpi×sub-scanning resolution of 600 dpi, and the intermediate concentration level is set as 4/9 (in a case where the maximum concentration level is set as 1). In FIG. 2, (b) and (e) respectively show a dither pattern of 3×3 (dither matrix), and a numeral in each lattice shows a dither threshold value.

In the conventional method, halftone processing is executed to an input image (a) by using a dither pattern (b) to generate a binary image shown in (c). The dither pattern (b) is a dither pattern composed of dither threshold values without consideration of resolution conversion to the binary image. A concentration of the binary image (c) per unit area is the order of the concentration of the input image (a). When resolution conversion is performed to the binary image (c), a contraction image (⅔ in size of the binary image and main scanning resolution of 600 dpi×sub-scanning resolution of 400 dpi) shown in (d) is obtained. The contraction image (d) can be obtained by erasing lines in a ratio of one to three to lines in the sub-scanning direction (horizontal direction). In the present embodiment, the erasure lines of the binary image (c) are erased. In this case, the concentration of the contraction image (d) changes or the pattern of the dither changes depending on where the erasure line is set. As a result, moiré (striped pattern) is generated in the contraction image (d) depending on the input image (a).

On the other hand, in the first embodiment, binarization processing is executed to the input image (a) by using the dither pattern shown in (e) to generate a binary image shown in (f). The dither pattern (e) is a dither pattern composed of dither threshold values in consideration of resolution conversion to the binary image. More specially, in the dither pattern, the same dither threshold rows (0, 5, and 3) are allotted to overlap lines in a sub-scanning direction as erasure objects. The overlap lines exist in the surroundings of complete storage lines. When contraction processing is executed to the binary image (f), a contraction image (⅔ in size of the binary image and main scanning resolution of 600 dpi×sub-scanning resolution of 400 dpi) shown in (g) is obtained. When the contraction image (g) is compared with the binary image (f), it is found out that the dither pattern does not nearly change and the concentration is kept the same therebetween.

Figure 3:
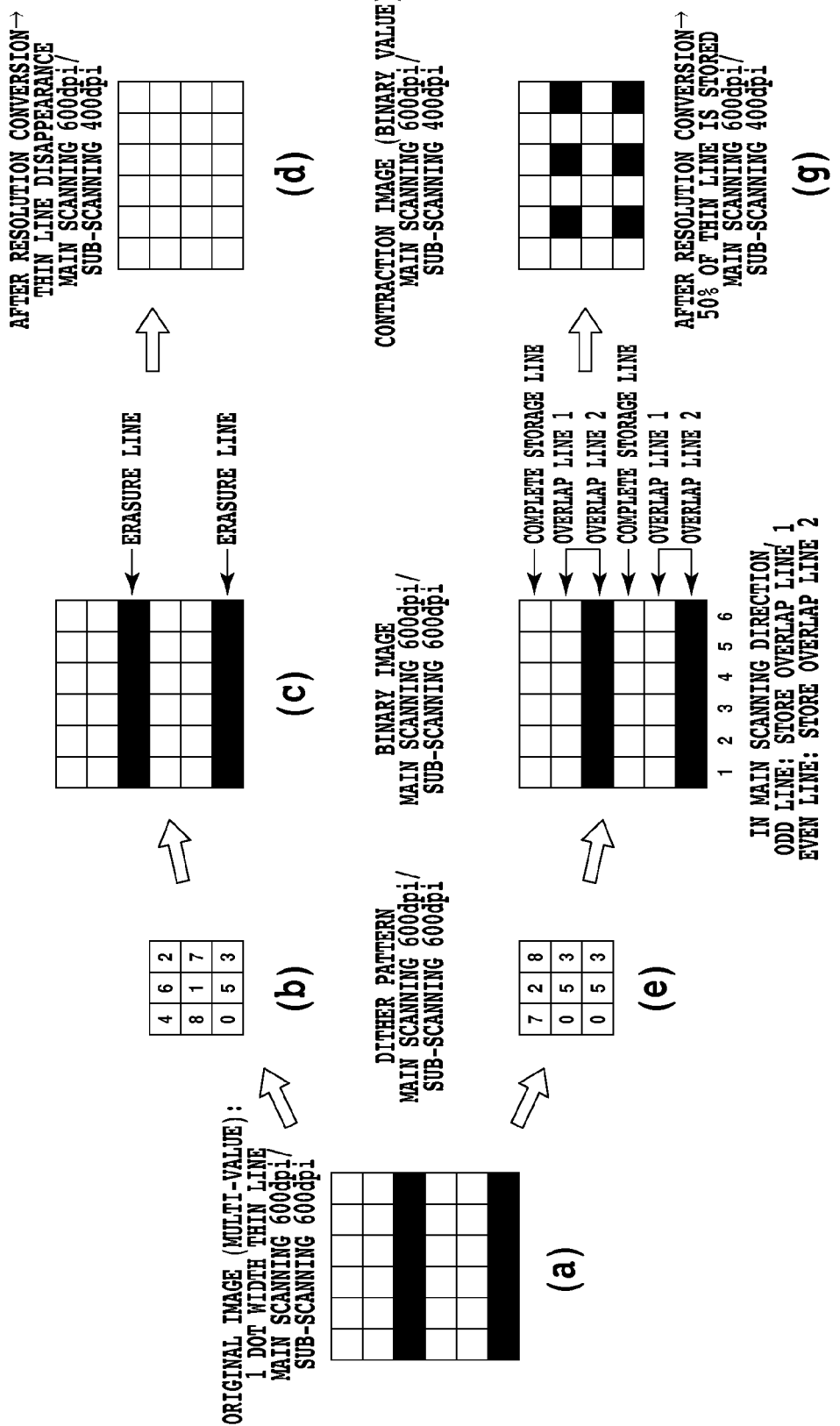
FIG. 3 illustrates an overview of halftone processing to a multi-value image and resolution conversion processing to a binary image and particularly, pixel disappearance after the resolution conversion.

FIG. 3 illustrates an overview of halftone processing to a multi-value image and resolution conversion processing to a binary image and in particular illustrates pixel disappearance after the resolution conversion.

In FIG. 3, (a) shows an input image (multi-value) as an original image. Resolution of the input image (a) is set as main scanning resolution of 600 dpi×sub-scanning resolution of 600 dpi, and the input image (a) after the resolution has the maximum concentration level (solid black). In FIG. 3, (b) and (e) respectively show a dither pattern of 3×3 (dither matrix), and a numeral in each lattice shows a dither threshold value.

In the conventional method, binarization processing is executed to an input image (a) by using a dither pattern (b) to generate a binary image shown in (c). That is, the binary image (c) becomes the same as the input image (a). When resolution conversion is performed to the binary image (c), a contraction image (⅔ in size of the binary image and main scanning resolution of 600 dpi×sub-scanning resolution of 400 dpi) shown in (g) is obtained. A contraction image (d) can be obtained by erasing lines in a ratio of one to three in regard to lines in the sub-scanning direction. Here, when the lines are simply erased in a ratio of one to three, the contraction image (d) where any printing is not made is possibly obtained. In the present example, the erasure lines of the binary image (c) are erased. That is, the original image is appropriately reproduced in the contraction image or the original image completely disappears in the contraction image depending on where the erasure line is set.

On the other hand, in the first embodiment, binarization processing is executed to the input image (a) by using the dither pattern shown in (e) to generate a binary image shown in (f). The dither pattern (e) is a dither pattern composed of dither threshold values in consideration of resolution conversion to the binary image. More specially, in the dither pattern, the same dither threshold rows (0, 5, and 3) are allotted to plural lines composed of a first line (overlap line 1) and a second line (overlap line 2) in a sub-scanning direction as erasure objects. When contraction processing is executed to the binary image (f), a contraction image (⅔ in size of the binary image and main scanning resolution of 600 dpi×sub-scanning resolution of 400 dpi) shown in (g) is obtained. The first embodiment, which is different from the conventional method, does not fix the erasure line and in a staggered form (zigzag shape in a case where the overlap lines are composed of two lines) thins pixels on the plural lines (overlap lines 1 and 2) adjacent in a sub-scanning direction in which halftone processing is executed at the same dither threshold value rows (0, 5 and 3). More specially, the pixel (first pixel) on the overlap line 1 in odd lines (lines 1, 3 and 5) in a main scanning direction is stored and the pixel (second pixel) on the overlap line 2 in even lines (lines 2 and 4) in a main scanning direction is stored. In other words, the pixel on the overlap line 2 is thinned in the odd line in the main scanning direction and the pixel on the overlap line 1 is thinned in the even line in the main scanning direction. When the resolution conversion is performed by thus thinning the pixels on the overlap lines 1 and 2 in a staggered form, the event that the original image completely disappears in the contraction image does not occur.

Next, generation processing of the dither pattern in the first embodiment will explained.

Figure 4:
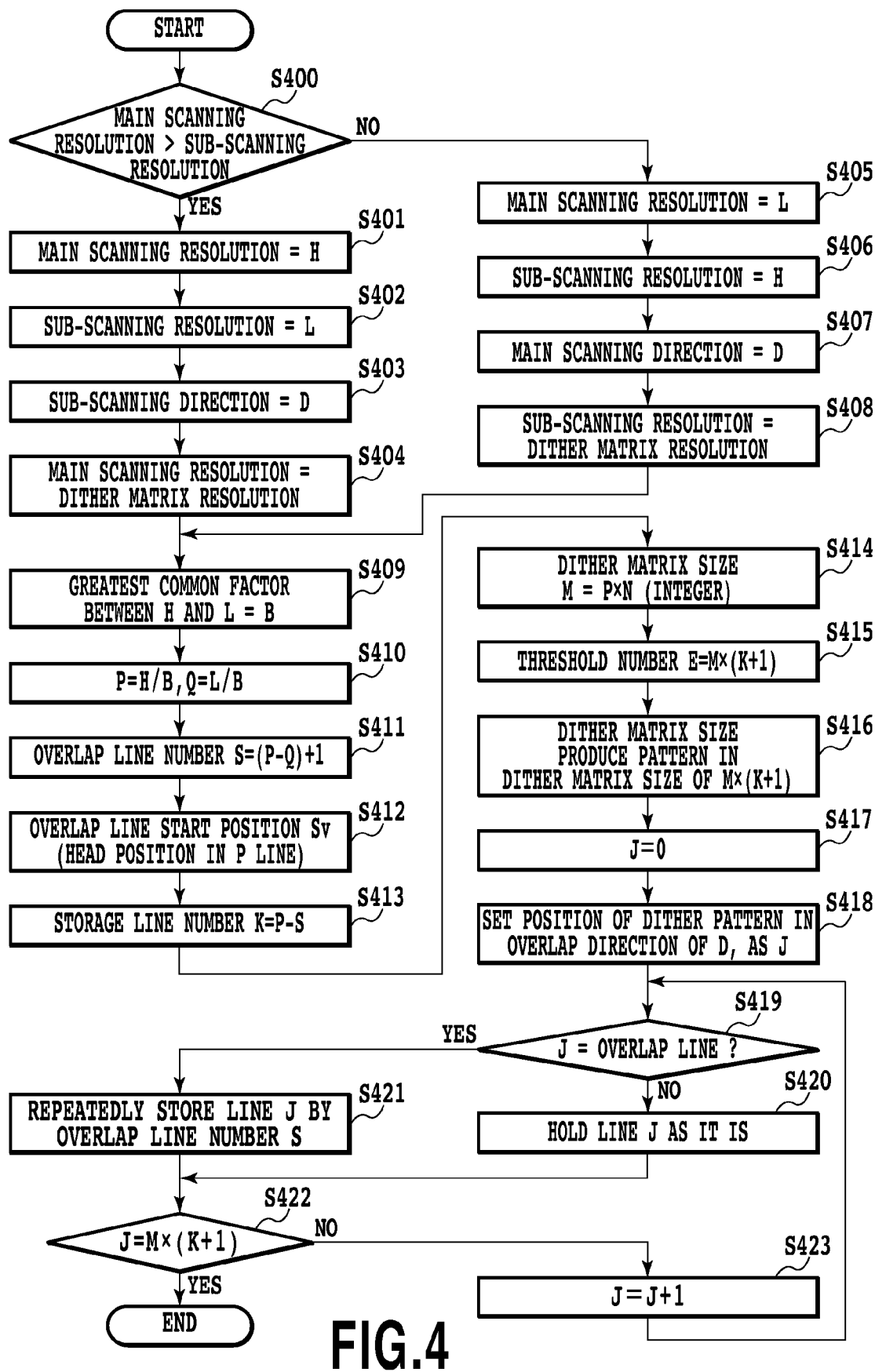
FIG. 4 is a flow chart showing the flow in dither pattern generation processing.

FIG. 4 is a flow chart showing the flow of the generation processing of the dither pattern by the controller 102.

At step S400, the controller 102 compares a main scanning resolution of the output device with a sub-scanning resolution thereof. When the main scanning resolution is higher than the sub-scanning resolution, the controller 102 advances processing to step S401 and when the main scanning resolution is not higher than the sub-scanning resolution, the controller 102 advances processing to step S405.

At step S401 to step S404, the controller 102 sets the main scanning resolution as H (high resolution) (S401), the sub-scanning resolution as L (low resolution) (S402), a sub-scanning direction as D (resolution conversion direction) (S403), and the main scanning resolution as dither matrix resolution (S404). On the other hand, at step S405 to step S408, the controller 102 sets the main scanning resolution as L (low resolution) (S405), the sub-scanning resolution as H (high resolution) (S406), the sub-scanning direction as D (resolution conversion direction) (S407), and the sub-scanning resolution as dither matrix resolution (S408).

Next, at step S409, the controller 102 sets the greatest common factor between H and L as B.

At step S410, the controller 102 determines P (=H/B) and Q (=L/B) from H, L, and B. P is a processing unit line number.

At step S411, the controller 102 determines the number S of overlap lines to which the same dither threshold rows are allotted, by using P and Q. Here, S can be determined according to the expression of S=(P−Q)+1. That is, the overlap lines are composed of S pieces of lines and the first line to the S-th line are adjacent in the resolution conversion direction.

At step S412, the controller 102 determines from what line among the processing unit lines the overlap line begins, that is, determines either a start position Sv or a start position Sh of the overlap line. Sv shows a start position of the overlap line in a sub-scanning direction and Sh shows a start position of the overlap line in a main scanning direction. In the first embodiment, the line which processed first among the processing unit lines is determined as a complete storage line and the other is determined as the overlap line. That is, the start position Sv or Sh of the overlap line is set as 2.

At step S413, the controller 102 sets the rest of the line numbers by subtracting the overlap line number from the processing unit line number P as a complete storage line number K (=P−S).

At step S414, the controller 102 determines a dither matrix size (matrix size of the dither pattern). In the first embodiment, the dither matrix M is set as N times (integral multiple) the processing unit line number P. That is, the dither matrix size M is equal to P×N. In consequence, the dither pattern which easily adapts to the resolution conversion can be generated.

At step S415, when the controller 102 allots dither threshold value rows overlapped by an amount corresponding to the overlap line number to the dither matrix size M, the tone number, that is, the number E of the dither threshold value is M×(K+1).

At step S416, the controller 102 generates a dither pattern (dither matrix) in which the number of the dither threshold value is E.

At step S417, the controller 102 initializes a variable J and at step S418, a line position of the dither pattern in the resolution conversion direction is set as J.

At step S419, the controller 102 determines whether or not the line of J is the overlap line, that is, whether or not the line of J corresponds to the start position Sv of the overlap line. In a case where the line of J is the overlap line, the controller 102 advances processing to step S421 and in a case where the line of J is not the overlap line, the controller 102 advances processing to step S420.

When the line of J is not the overlap line, the line of J is a complete storage line. Therefore, at step S420, the controller 102 stores the line of J as it is. On the other hand, when the line of J is the overlap line, at step S421 the controller 102 repeatedly stores the line of J by an amount of the overlap line number S.

At step S422, it is determined whether J has reached the dither matrix size. When it is determined that J has reached the dither matrix size, the controller 102 ends the processing and when it is determined that J has not reached the dither matrix size, the controller 102 advances processing to step S423 and J is incremented so as to advance to the next line. Then, the controller 102 returns processing to step S419, and the processing of steps S419 to S423 are repeated until it is determined in step S422 that J has reached the dither matrix size.

The processing from step S400 to step S415 will be explained with reference to a specific example. For example, it is assumed that the output device has the main scanning resolution of 600 dpi and the sub-scanning resolution of 400 dpi. In this case, since it is determined at step S400 that the main scanning resolution>the sub-scanning resolution, the controller 102 sets H=600, L=400, and D=sub-scanning direction at steps S401 to S403. Next, the controller 102 sets B=200, P=3 (=600/200), Q=2 (=400/200), S=2 (=3−2+1), Sv=2, K=1 (=2−1) at steps S409 to S413. Next, the controller 102 sets M=3N (N is an integral) at step S414. For example, in a case where N=1, since M=3, the controller 102 sets E=6 (=3×(1+1)) at step S415.

Based upon the above-described processing, there can be produced a dither pattern (for example, a dither pattern shown in (e) of FIG. 2 or (e) of FIG. 3) arranging the dither threshold value rows on the precondition of performing the resolution conversion to an image in the resolution conversion direction.

In the dither pattern thus produced, the same dither threshold value is located at the pixel positions to which the thinning processing is scheduled to be executed after the halftone processing. A binary image generated by using this dither pattern is equivalent to an image by enlarging to the original image a contraction image obtained by executing contraction processing to the binary image. Since two lines (two adjacent lines) as thinned objects in the binary image are halftone-processed with the same dither threshold value, when the two corresponding lines in the original image have the same concentration value, the two corresponding lines in the binary image result in the same image. Therefore, even if either of the two lines is thinned and such thinned line is converted in resolution, information of the original image is held.

Next, the resolution conversion processing to the binary image generated by using the aforementioned dither pattern will be described.

Figure 5:
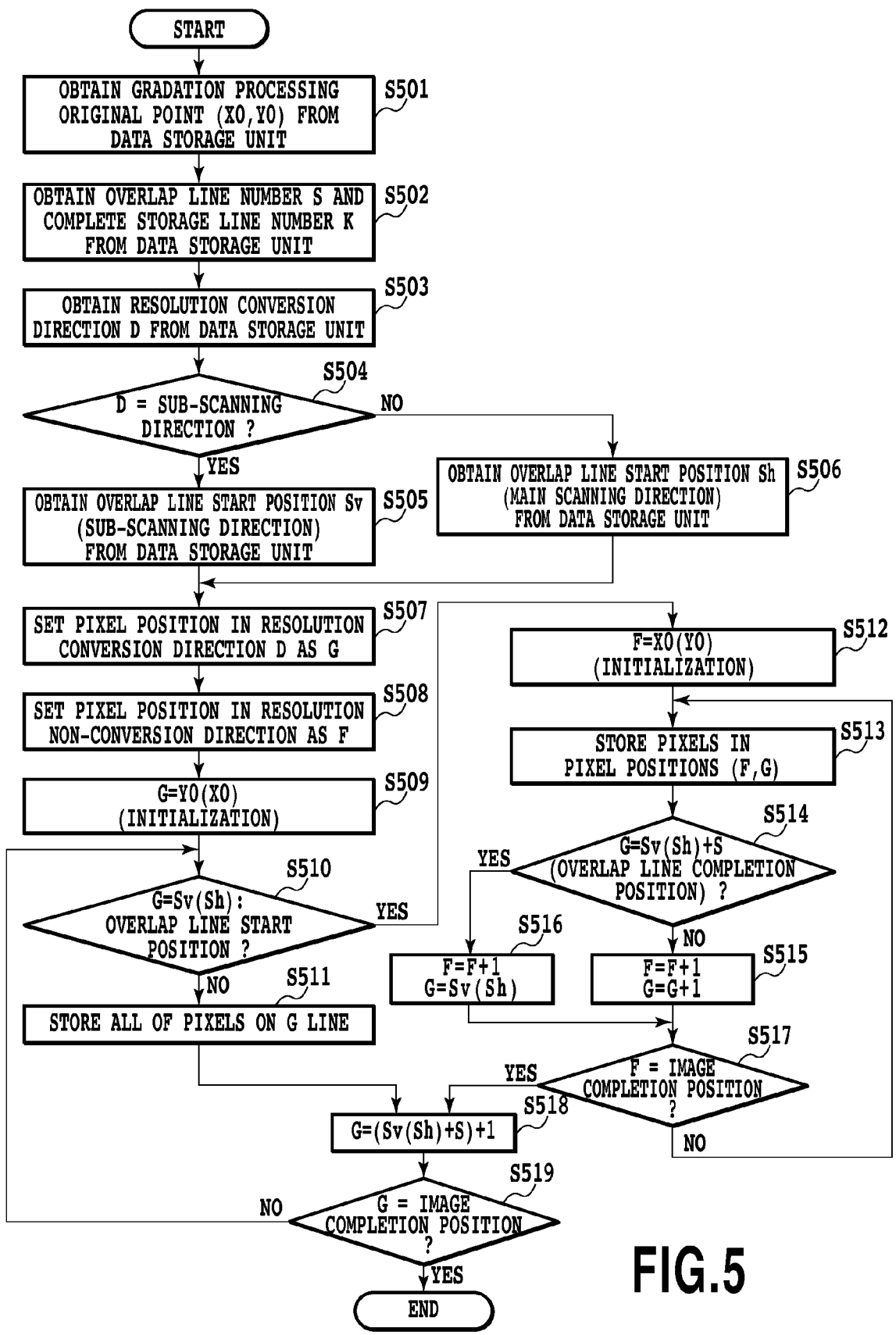
FIG. 5 is a flow chart showing the flow in resolution conversion processing according to an exemplary embodiment.

FIG. 5 is a flow chart showing the flow of the resolution conversion processing according to the first embodiment.

At step S501 to step S503, the controller 102 reads out a halftone processing original point (X0, Y0) to an image data (S501), an overlap line number S as the processing unit of the resolution conversion (S502), a complete storage line number K (S502), and a resolution conversion direction D (S503), from the data storage unit 103. These pieces of information are stored in the data storage unit 103 in the image processing device upon executing the halftone processing.

At step S504, the controller 102 determines whether the read resolution conversion direction D is a main scanning direction or a sub-scanning direction. When it is determined that the resolution conversion direction D is the sub-scanning direction, the controller 102 advances processing to step S505 and when it is determined that the resolution conversion direction D is the main scanning direction, the controller 102 advances processing to step S506.

At step S505, the controller 102 reads out a start position Sv of an overlap line (sub-scanning direction) from the data storage unit 103. On the other hand, at step S506, the controller 102 reads out a start position Sh of an overlap line (main scanning direction) from the data storage unit 103. These pieces of information are stored in the data storage unit 103 in the image processing device upon executing the halftone processing.

Next, at steps S507 and S508, the controller 102 sets a pixel position in the resolution conversion direction D as G (S507) and a pixel position in a resolution non-conversion direction as F (S508). The resolution non-conversion direction means a main scanning direction when the resolution conversion direction is a sub-scanning direction and a sub-scanning direction when the resolution conversion direction is a main scanning direction.

At step S509, when the resolution conversion direction D is the sub-scanning direction, the controller 102 sets Y0 (initial value) to the pixel position G in the resolution conversion direction D to initialize the pixel position G. On the other hand, when the resolution conversion direction D is the main scanning direction, the controller 102 sets X0 (initial value) to the pixel position G in the resolution conversion direction D to initialize the pixel position G.

At step S510, the controller 102 determines whether the pixel position G in the resolution conversion direction is a start position (Sv or Sh) of the overlap line. When the pixel position G in the resolution conversion direction is not the start position of the overlap line, the controller 102 advances processing to step S511. When the pixel position G in the resolution conversion direction is the start position of the overlap line, the controller 102 advances processing to step S512.

At step S511, the controller 102 stores all the pixels of the line in the pixel position G in the resolution conversion direction as pixels of the complete storage line. After step S511, the controller 102 advances processing to step S518.

At step S512, when the resolution conversion direction is the sub-scanning direction, the controller 102 (initial value) to the pixel position F of the resolution non-conversion direction to initialize the pixel position F. On the other hand, when the resolution conversion direction is the main scanning direction, the controller 102 sets Y0 (initial value) to the pixel position F of the resolution conversion direction to initialize the pixel position F.

At step S513, the controller 102 stores the pixels in the pixel positions (F, G).

At step S514, the controller 102 determines whether the pixel position G in the resolution conversion direction is a final line in the resolution conversion direction. When the pixel position G of the resolution conversion direction is the final line, the controller 102 advances processing to step S516. When the pixel position G of the resolution conversion direction is not the final line, the controller 102 advances processing to step S515.

At step S515, the controller 102 advances each of the pixel position F in the resolution non-conversion direction and the pixel position G in the resolution conversion direction to the next position, that is, advances the pixel positions (F, G) to the next pixel positions (F+1, G+1) and the controller 102 advances processing to step S517.

On the other hand, at step S516, the controller 102 returns the start position of the overlap line back to the pixel position G in the resolution conversion direction and advances the pixel position F in the resolution non-conversion direction to the next position and the controller 102 advances processing to step S517.

By referring to (f) in FIG. 3, pixels in the overlap line 1 and the overlap line 2 are in a staggered form read out in a main scanning direction (right direction) by the processing of steps S513, S514, and S515 and stored. In general, first, pixels in a binary image obtained using an F-th dither value among dither threshold rows contained in an F-th line (1<=F<=S−1) among S pieces of the overlap lines in the dither matrix are read out and stored. Next, pixels in a binary image obtained using a (F+1)-th dither value among dither threshold rows contained in a (F+1)-th line among the S pieces of the lines are read out and stored.

At step S517, the controller 102 determines whether the pixel position F of the resolution non-conversion direction is an image completion position. When the pixel position F of the resolution non-conversion direction is the completion position, the controller 102 advances processing to step S518. When the pixel position F of the resolution non-conversion direction is not the completion position, the controller 102 returns processing to step S513, and the processing continues.

At step S518, the controller 102 increments the overlap line number in the image position G in the resolution conversion direction and goes to the next processing in step S519.

At step S519, the controller 102 determines whether or not the pixel position G in the resolution conversion direction is an image completion position. When the pixel position G of the resolution conversion direction is not the completion position, the controller 102 returns processing to step S510, and the processing continues. When the pixel position G of the resolution conversion direction is the completion position, the resolution conversion processing ends.

As a result of the above processing, the position of the pixel to be thinned in the portion to which the halftone processing is executed as the overlap line is switched in response to the position of the resolution non-conversion direction (in a case of (f) in FIG. 3, a main scanning direction).

At steps S509 to S519, the pixels on the overlap lines, that is, the two adjacent lines among the plural lines as objects to be thinned are alternately thinned. For example, in a case of converting an image in which the resolution in a main scanning direction is 600 dpi into the image in which the resolution in a main scanning direction is 400 dpi, two adjacent lines out of three main scanning lines of the image are thinned in a staggered form.

Further, in a case where the original image can be realized only with resolution higher than the resolution after the conversion, for example, in a case where the original image is provided with a thin line of a one-dot width having the resolution of 600 dpi, when either one of the lines is thinned simply, an event occurs in which the pixel remains or does not remain depending on the thinning position. When the event occurs that the pixel does not remain, the thin line of the one-dot width of the resolution 600 dpi in the original image completely disappears. However, caused by thinning the lines in a staggered form by the above-described processing, upon thinning pixels for the resolution conversion, the thinning line is not fixed and pixels in a plurality of lines processed with the same threshold value are alternately left. That is, the pixels in the two adjacent lines are thinned in a staggered form and therefore, it is possible to leave pixels in any of the two lines halftone-processed with same threshold value row after the resolution conversion in a given ratio. Thus, the probability for storing the original image is increased even after processing the resolution conversion, and it is possible to avoid the disappearance of the print data such as thin lines.

The first embodiment (described above) illustrates an example of switching the position of the pixel thinned from the two adjacent overlap lines in accordance with the position in the resolution non-conversion direction. That is, the first embodiment shows the example of alternately switching the overlap lines (overlap line 1 and overlap line 2) as thinned objects in accordance with the position in the resolution non-conversion direction (odd line or even line). On the other hand, in a case where it is assumed that the pixels are dispersed in some degrees like the halftone region, the overlap line as the thinned object may not be switched in accordance with the position of the resolution conversion direction to thin an entire fixed line the processing of which is executed at a high speed.

Figure 6:
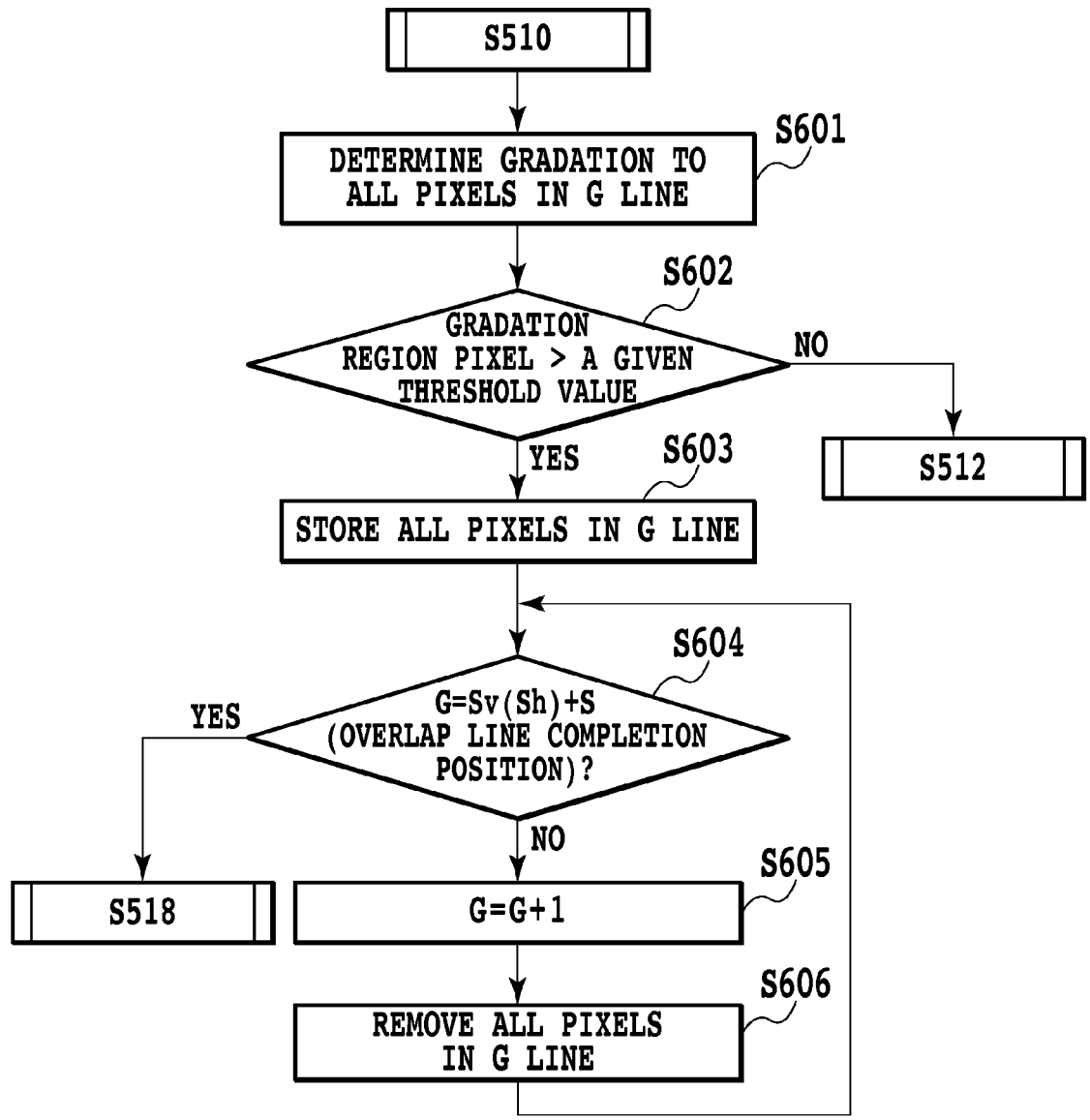
FIG. 6 is a flow chart showing the flow in resolution conversion processing according to another exemplary embodiment.

FIG. 6 is a flow chart showing the flow of resolution conversion processing according to the second embodiment.

At S510 in the flow in FIG. 5, the controller 102 determines whether the pixel position G in the resolution conversion direction is a start position (Sv or Sh) of the overlap line. When the pixel position G in the resolution conversion direction is the start position of the overlap line, the controller 102 advances processing to step S601.

At step S601, the controller 102 makes a halftone determination on the pixel of the corresponding overlap line.

At step S602, the controller 102 determines whether or not a pixel value of the pixel belonging to the halftone region exceeds a given dither value. When the pixel value of the pixel belonging to the halftone region does not exceed the given dither value, the controller 102 advances processing to step S512 in the flow in FIG. 5. On the other hand, when the pixel value of the pixel belonging to the halftone region exceeds the given dither value, the controller 102 advances processing to step S603.

At step S603, the controller 102 stores the entire overlap line of the pixel position G without switching the overlap line as the thinned object.

At step S604, the controller 102 determines whether or not the pixel position G is a completion position of the overlap line. When the pixel position G is not the completion position of the overlap line, the controller 102 advances processing to step S605. On the other hand, when the pixel position G is the completion position of the overlap line, the controller 102 advances processing to step S518 in the flow in FIG. 5.

At steps S605 and S606, the controller 102 goes to the next overlap line (S605) and removes all the line (S606), and processing then returns to step S604.

The second embodiment performs simple line thinning for storing only the fixed line and removing the other overlap line in regard to the overlap lines. The determination of step S602 may be made as halftone region pixel>non-halftone region pixel. On the other hand, as a result of making the halftone determination to the pixel of the overlap line, when halftone region pixel<non-halftone region pixel, since many edge portions are expected to be contained, the controller 102 performs processing of step S512 where the switching similar to that of the first embodiment may be performed. In consequence, it is possible to switch the processing in accordance with the attribute of the pixel on the liner.

The present invention can realize the functions of an above-described embodiment with a construction that a recording medium recording program code (software) for realizing the functions of the above-described embodiment is attached to a system or a device and a computer of the system reads out the program code from the recording medium. The recording medium is a computer-readable recording medium. In this case, the program itself read out from the recording medium is realizes the functions of the above-described embodiment. In addition, an operating system (OS) or the like running on a computer may execute a part or all of the actual processing based upon commands of the program code, thus realizing the function of the aforementioned embodiment. Further, after the program code is read out from the recording medium, it can be written in a function expanding card or a function expansion unit of a computer, and the function expansion card or the like executes a part or all of the processing based upon commands of the program code. Thus, the above-described embodiment may be realized.

In a case where the present invention is applied to the above recording medium, the program code corresponding to the flow chart described above is stored in the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-056644, filed Mar. 6, 2008, which is hereby incorporated by reference herein in its entirety.

What is claimed is:

1. An image processing device that outputs a binary image to an output device in which resolution in a main scanning direction is higher than resolution in a sub-scanning direction, the image processing device comprising:
 a halftone processing unit that compares a multi-value image with a dither matrix to generate a binary image in which the resolution in the main scanning direction is equal to the resolution in the sub-scanning direction; and
 a thinning unit that thins a plurality of pixels from the binary image in which the resolution in the main scanning direction is equal to the resolution in the sub-scanning direction to generate the binary image in which the resolution (H (dpi)) in the main scanning direction is higher than the resolution (L (dpi)) in the sub-scanning direction, wherein the halftone processing unit generates a dither matrix including S pieces of lines in the sub-scanning direction (where S=(P−Q)+1, and where P=H/B, Q=L/B and B is the greatest common factor between H and L), wherein a first line to an S-th line among the S pieces of the lines are adjacent to each other in the sub-scanning direction and hold the same threshold rows, and wherein the thinning unit outputs, as pixels adjacent in the main scanning direction in the binary image in which the resolution in the main scanning direction is higher than the resolution in the sub-scanning direction, pixels in a binary image obtained using an F-th dither value in the main scanning direction among dither threshold rows contained in an F-th line (where 1<=F<=S−1) among the S pieces of the lines and pixels in a binary image obtained using a (F+1)-th dither value in the main scanning direction among dither threshold rows contained in a (F+1)-th line among the S pieces of the lines.

2. An image processing device that outputs a binary image to an output device in which resolution in a sub-scanning direction is higher than the resolution in a main scanning direction, the image processing device comprising:

a halftone processing unit that compares a multi-value image with a dither matrix to generate a binary image in which the resolution in the sub-scanning direction is equal to the resolution in the main scanning direction; and a thinning unit that thins a plurality of pixels from the binary image in which the resolution in the sub-scanning direction is equal to the resolution in the main scanning direction to generate the binary image in which the resolution (H (dpi)) in the sub-scanning direction is higher than the resolution (L (dpi)) in the main scanning direction, wherein the halftone processing unit generates a dither matrix including S pieces of lines in the main scanning direction (where S=(P−Q)+1 and where, P=H/B, Q=L/B and B is the greatest common factor between H and L), wherein a first line to an S-th line among the S pieces of the lines are adjacent to each other in the main scanning direction and hold the same threshold rows, and wherein the thinning unit outputs, as pixels adjacent in the sub-scanning direction in the binary image in which the resolution in the sub-scanning direction is higher than the resolution in the main scanning direction, pixels in a binary image obtained using an F-th dither value in the sub-scanning direction among dither threshold rows contained in an F-th line (where 1<=F<=S−1) among the S pieces of the lines and pixels in a binary image obtained using a (F+1)-th dither value in the sub-scanning direction among dither threshold rows contained in a (F+1)-th line among the S pieces of the lines.

3. A method for executing an image processing device which outputs a binary image to an output device in which resolution in a main scanning direction is higher than the resolution in a sub-scanning direction, the method comprising:

comparing a multi-value image with a dither matrix to generate a binary image in which the resolution in the main scanning direction is equal to the resolution in the sub-scanning direction; and thinning a plurality of pixels from the binary image in which the resolution in the main scanning direction is equal to that the resolution in the sub-scanning direction to generate the binary image in which the resolution (H (dpi)) in the main scanning direction is higher than that the resolution (L (dpi)) in the sub-scanning direction, wherein the dither matrix includes S pieces of lines in the sub-scanning direction (where S=(P−Q)+1, and where P=H/B, Q=L/B and B is the greatest common factor between H and L), wherein a first line to an S-th line among the S pieces of the lines are adjacent to each other in the sub-scanning direction and hold the same threshold rows, and wherein thinning the plurality of pixels includes outputting, as pixels adjacent in the main scanning direction in the binary image in which the resolution in the main scanning direction is higher than the resolution in the sub-scanning direction, pixels in a binary image obtained using an F-th dither value in the main scanning direction among dither threshold rows contained in an F-th line (where 1<=F<=S−1) among the S pieces of the lines and pixels in a binary image obtained using an (F+1)-th dither value in the main scanning direction among dither threshold rows contained in an (F+1)-th line among the S pieces of the lines.

* * * * *